United States Patent Office.

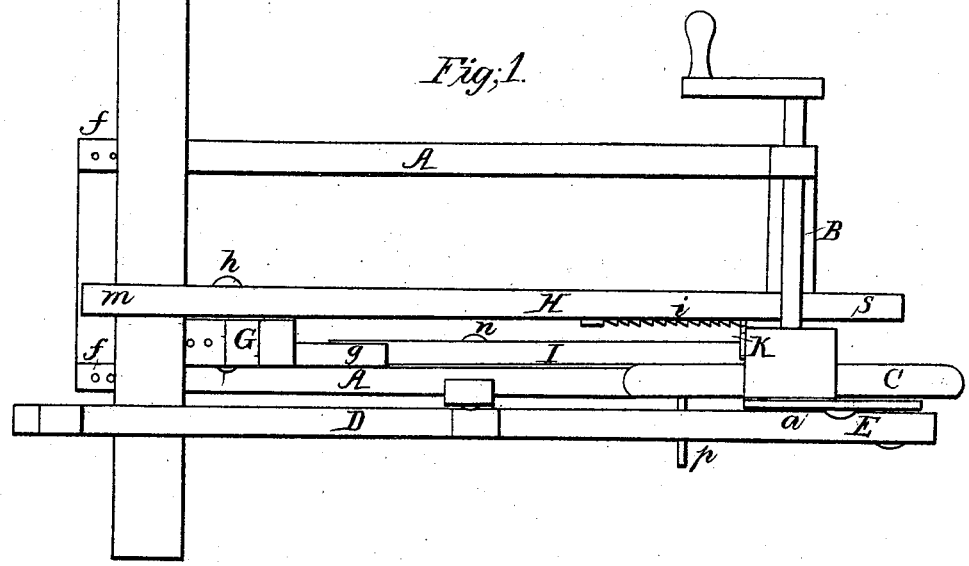
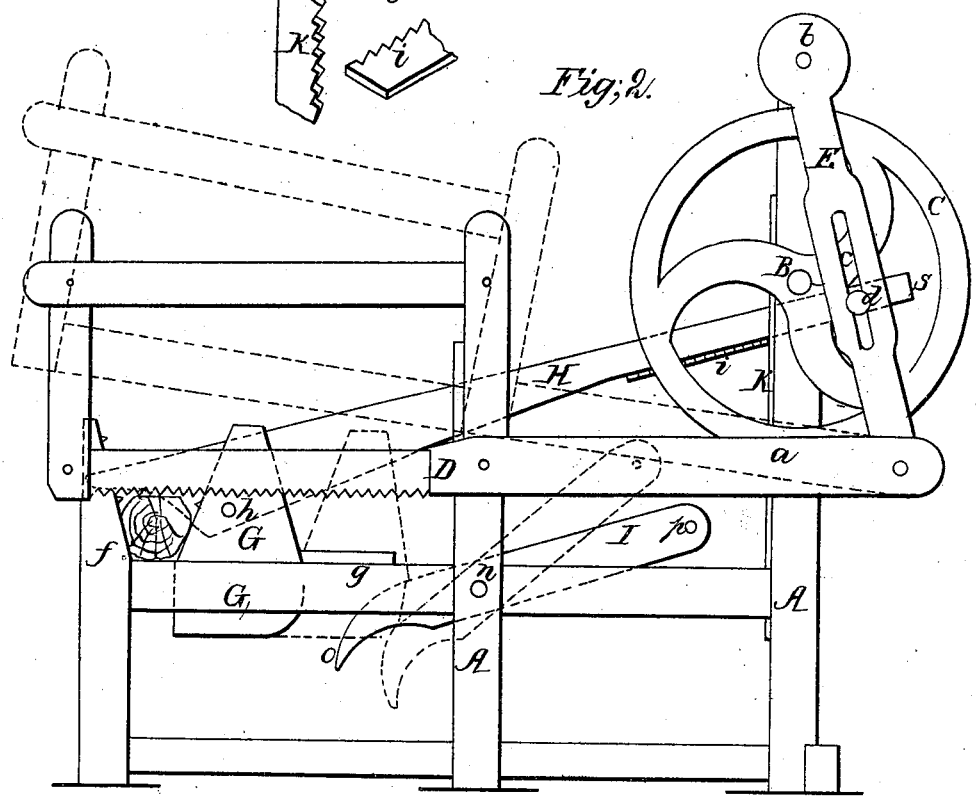

JABEZ K. BABCOCK, OF SHORTSVILLE, ASSIGNOR TO JOHN DOYLE, OF BRISTOL, NEW YORK.

Letters Patent No. 87,233, dated February 23, 1869.

IMPROVEMENT IN SAWING-MACHINE.

The Schedule referred to in these Letters Patent and making part of the same.

*To all whom it may concern:*

Be it known that I, JABEZ K. BABCOCK, of Shortsville, in the county of Ontario, and State of New York, assignor to JOHN DOYLE, of the town of Bristol, county and State aforesaid, have invented a certain new and useful Machine for Sawing Wood; and I do hereby declare that the following is a full and exact description thereof, reference being had to the accompanying drawings, making part of this specification, in which—

Figure 1 is a plan of my improved machine.

Figure 2, an elevation of the same.

Figure 3, a diagram, showing the arrangement of the ratchets for adjusting and holding the pressure-bar.

Like letters of reference indicate corresponding parts in all the figures.

My improvement is of that class designed for cutting fire-wood.

The invention consists in an improved arrangement of parts for clamping and holding the stick in place, and for elevating the saw therefrom when the stick is released; also in an improved method of connecting the saw with the power, whereby a less sweep and less space are required for the saw to act.

In the drawings—

A indicates the main frame;

B, the crank-shaft;

C, the balance-wheel; and

D, the saw.

These parts are all similar to those ordinarily employed.

I connect the saw-shank $a$ with the balance-wheel in a peculiar manner. To this end, a pendent rock-bar, E, is pivoted at $b$, above the balance-wheel, extending downward, face to face with it, and having pivoted to the lower end the shank of the saw.

A slot, $c$, is formed in this rock-bar, in which rests a crank-pin, $d$, secured to the balance-wheel.

The saw-shank is thus simply suspended by the rock-bar, and rocks to and fro by means of the crank-pin.

The action is thus equal and uniform, and the saw-blade has that convex or rounding cut over the log or stick that is necessary to make it cut rapidly and easily.

The weight of the saw is also removed from the balance-wheel, so that there is no unusual strain at any portion of the stroke.

Ordinarily the shank of the saw is either connected directly to the balance-wheel itself, by which the weight comes thereon, or else it is connected by a pitman, which requires much longitudinal space, and creates a greater amount of friction.

I avoid these difficulties by suspending the saw-shank, and making the crank-pin move it forward and back.

The stick to be sawed is laid across the foot of the main frame, resting against the standards $f f$.

On the opposite side of the stick, a block, G, slides forward and back, on a way, $g$, and is made to clamp against the stick by means of a pressure-bar, H, which is pivoted to it at $h$, and extends back, within reach of the operator.

At the rear end, this pressure-bar is armed with a horizontal ratchet, $i$, which engages at any height with a vertical ratchet, $k$, secured to one of the posts of the main frame.

The operation of this portion of the invention is as follows:

The stick having been placed in the right position, the block G is moved up, so as to clamp it between said block and the standards $f f$. The long end $s$ of the lever is then raised, so as to bring the short end $m$ over the top of the stick, thereby clasping the latter on four sides, so that it is impossible for it to work loose or get away.

When the proper pressure is brought to bear, the ratchets $i$ $k$ are engaged together, thereby retaining the pressure-bar in place.

These ratchets have a special relation to each other in holding the bar, for $i$ holds the horizontal pressure of the block G against the stick, while $k$ holds the vertical pressure of the end, $m$, on top the stick.

This arrangement of the double ratchets, with the pressure-bar and block bearing upon two sides of the stick, I claim as a novel feature of my machine.

In rear of the sliding block G, and in line with it, is located a lever, I, pivoted at $n$, the lower end, $o$, being curved down, so as to be struck by the said block as it is drawn back, while the upper end is armed with a laterally-projecting pin, $p$, that rests under the said shank, as shown.

The object of this lever is to elevate the saw from the stick when the cut is made, which is accomplished by the sliding-block striking the lever, and tilting it, thereby throwing up the pin $p$, and the saw with it, as indicated by red lines, fig. 2.

What I claim as my invention, and desire to secure by Letters Patent, is—

1. The block G, sliding in ways $g$, and having pivoted thereto the pressure-bar H, which is shouldered at one end, and provided with ratchet $i$, at the other end, when all the parts are constructed and operated as described.

2. The lever I, pivoted at $n$, having a curve, $o$, at one, and a pin, $p$, at the other end, in combination with the sliding block G, all the parts being operated in the manner described, for the purpose specified.

3. The arrangement of the slotted rocking-arm E, wrist-pin $d$, saw-shank $a$, saw D, block G, pressure-bar H, and pivoted lever I, as herein described, and for the purpose set forth.

In witness whereof, I have hereunto signed my name, in the presence of two subscribing witnesses.

JABEZ K. BABCOCK.

Witnesses:
R. F. OSGOOD,
H. S. FAIRCHILD.